(12) United States Patent
Spehl

(10) Patent No.: US 10,567,030 B2
(45) Date of Patent: Feb. 18, 2020

(54) MOTOR VEHICLE WITH RADIO MODEM, RADIO MODEM, AND METHOD FOR EXCHANGING COMMUNICATION DATA

(71) Applicant: Audi AG, Ingolstadt (DE)

(72) Inventor: Jürgen Spehl, Wettstetten (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/309,748

(22) PCT Filed: May 30, 2017

(86) PCT No.: PCT/EP2017/063027
§ 371 (c)(1),
(2) Date: Dec. 13, 2018

(87) PCT Pub. No.: WO2017/215908
PCT Pub. Date: Dec. 21, 2017

(65) Prior Publication Data
US 2019/0140684 A1    May 9, 2019

(30) Foreign Application Priority Data

Jun. 14, 2016    (DE) .......................... 10 2016 007 193

(51) Int. Cl.
*H04B 1/403*    (2015.01)
*H04B 1/00*     (2006.01)

(52) U.S. Cl.
CPC ........... *H04B 1/406* (2013.01); *H04B 1/0007* (2013.01); *H04B 1/0067* (2013.01)

(58) Field of Classification Search
CPC ......... H04L 67/12; G01S 7/006; H04B 1/406; H04B 1/0007; H04B 1/0067
See application file for complete search history.

(56) References Cited

U.S. PATENT DOCUMENTS

2003/0139179 A1   7/2003   Fuchs et al.
2003/0179831 A1*  9/2003   Gupta ................... H03F 1/3247
                                                         375/296
(Continued)

FOREIGN PATENT DOCUMENTS

DE      102013222915 A1    5/2014
EP          2816851 A1    12/2014
WO    WO-2017189035 A1 *  11/2017 ............ H04W 4/046

OTHER PUBLICATIONS

International Search Report and Written Opinion of the International Search Authority directed to related International Patent Application No. PCT/EP2017/063027, dated Aug. 14, 2017, with attached English-language translation; 22 pages.

*Primary Examiner* — Aristocratis Fotakis
(74) *Attorney, Agent, or Firm* — Sterne, Kessler, Goldstein & Fox P.L.L.C.

(57) ABSTRACT

The disclosure relates to a radio modem for a motor vehicle, having an antenna arrangement, an AD-DA converter and a processor for exchanging communications data between the motor vehicle and at least one object in the vicinity of the motor vehicle. The processor is configured to provide at least one communications standard, which in each case specifies a digital protocol stack for controlling the exchange of communications data and a radio frequency f0 for a radio signal, and implementing every provided communications standard by operating the associated protocol stack and by providing a digital mixer, which is coupled on a baseband side to the protocol stack and on an HF side to the AD-DA converter and which provides for the radio frequency f0 on the HF side, wherein the AD-DA converter is connected directly between the processor and the antenna arrangement.

9 Claims, 1 Drawing Sheet

(56) References Cited

U.S. PATENT DOCUMENTS

| | | |
|---|---|---|
| 2007/0019672 A1 | 1/2007 | Guthrie |
| 2009/0232191 A1 | 9/2009 | Gupta et al. |
| 2010/0234071 A1 | 9/2010 | Shabtay et al. |
| 2010/0260147 A1* | 10/2010 | Xing .................. H04K 3/226 370/332 |
| 2014/0035774 A1* | 2/2014 | Khlifi .................. G01S 7/006 342/21 |
| 2014/0135061 A1 | 5/2014 | Rousu et al. |
| 2014/0215115 A1* | 7/2014 | Gunthner ............ H04L 67/12 710/305 |
| 2015/0087253 A1 | 3/2015 | Johansson et al. |
| 2015/0092880 A1 | 4/2015 | Johansson et al. |
| 2015/0282210 A1* | 10/2015 | Li ...................... H04W 76/14 455/436 |
| 2016/0112846 A1* | 4/2016 | Siswick ............... H04B 17/27 455/456.4 |
| 2016/0375732 A1* | 12/2016 | Lazar, II .............. G01P 7/00 73/115.08 |
| 2017/0021764 A1* | 1/2017 | Adams ................ B60Q 9/00 |
| 2017/0214746 A1* | 7/2017 | Zettler ................ G01S 7/006 |
| 2017/0323562 A1* | 11/2017 | Rech .................. G08G 1/017 |
| 2018/0242127 A1* | 8/2018 | Kwoczek ............ H04L 69/14 |
| 2018/0252809 A1* | 9/2018 | Davis ................. G01S 13/931 |
| 2018/0321689 A1* | 11/2018 | Lehmann ............ G05D 1/0289 |
| 2019/0043347 A1* | 2/2019 | Biehle ................ G08G 1/0112 |
| 2019/0088124 A1* | 3/2019 | Voigt ................ G08G 1/096791 |

\* cited by examiner

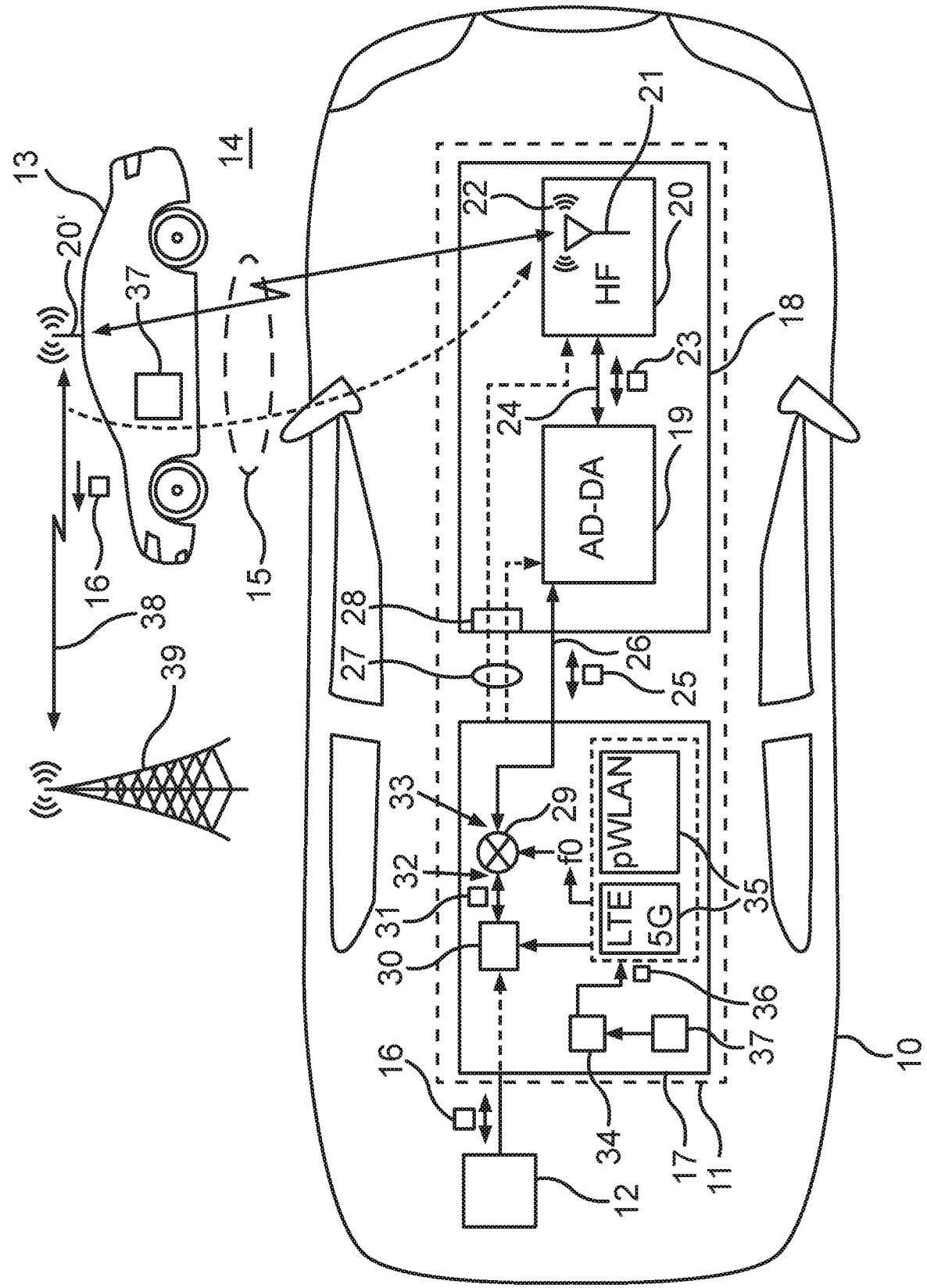

MOTOR VEHICLE WITH RADIO MODEM, RADIO MODEM, AND METHOD FOR EXCHANGING COMMUNICATION DATA

TECHNICAL FIELD

The present application relates to a radio modem for a motor vehicle to undertake Car2X communications for example using the motor vehicle. By means of the radio modem, transmit radio signals can be generated from communications data and communications data can be generated from the received radio signals. A motor vehicle with the radio modem as well as a method for exchanging communications data is also disclosed.

BACKGROUND

Currently, every radio service (also referred to as radio layer) requires dedicated hardware in the form of special mobile communication modems. By means of a radio modem and in the manner described, one can generate a radio signal from digital transmit data (by modulation when transmitting), and receive digital data from a radio signal (by demodulation when receiving). For the communication or the exchange of communications data between motor vehicles amongst each other (Car2Car, see also https://www.car-2-car.org) or between a motor vehicle and an infrastructure component, such as a traffic light or a traffic sign (Car2I), there are currently two possible radio standards, of which one is based on a mobile communications standard, Long-Term Evolution (LTE), and the other is based on the wireless local area network (WLAN) standard. The described communication services are also grouped together as Car2X or vehicular ad hoc networks.

To provide the described Car2X communication universally in a motor vehicle, elaborate hardware is thus required that can operate both communications standards, in other words that can generate and receive the necessary radio frequencies, and can provide the associated protocol stack for communication control purposes. A protocol stack is hereby at least a program module, by means of which the communications data is processed, to hereby define a communications link between the motor vehicle on the one hand and an object in the vicinity on the other. For example, a protocol stack can implement the layers of the International Organization for Standardization Open System Interconnection (ISO-OSI) reference model.

A motor vehicle, which provides two communications standards, is known from EP 2 816 851 A1. According to it, two transceivers of different Radio Access Technology (RAT) are provided, which receive transmit data via a communications bus and generate from it a radio signal by modulation, or conversely generate receive data from a received radio signal by demodulation and can transmit it to the communications bus. Also connected to the communications bus is a digital signal processor, which generates the transmit data or processes the receive data. A disadvantage of this motor vehicle is that the conversion of transmit data into the radio signal or the conversion of the radio signal into receive data must be carried out by a separate mixer, which couples the bus to the transceivers. This requires an additional component and thereby makes the manufacture of the motor vehicle undesirably component-intensive.

A motor vehicle with a multi-Radio Access Technology (multi-RAT) system is known from US 2010/0234071 A1. Multiple protocol stacks can be provided by a processor. To transmit and receive radio signals, multiple high-frequency circuits are provided, which each have a mixer. This also makes manufacturing the system hardware-intensive.

From DE 10 2013 222 915 A1, a motor vehicle is known, in which two radio modems are provided, which can share one antenna. Providing two radio modems is also component-intensive.

From US 2003/0139179 A1, a communications system is known, which is equipped with two different network protocols. Two separate hardware radio interfaces are provided for this purpose.

From US 2007/0019672 A1, a communications system is known, which can switch between the Bluetooth™ standard and the ZigBee™ standard, wherein baseband modules are provided for these two communications standards, in other words hardware circuits, for this purpose. The protocol stacks are also partially implemented by the respective module.

From US 2009/0232191 A1, a communications system is known, in which a digital communications signal is converted by means of a digital mixer into a digital HF signal, which is converted by means of a digital analog converter into an analog HF signal.

BRIEF DESCRIPTION OF DRAWINGS/FIGURES

FIG. 1 illustrates a schematic view of a motor vehicle system, in accordance with some embodiments.

DETAILED DESCRIPTION

The purpose is to provide a radio modem with low component costs for Car2X communications.

The purpose is achieved by means of the subject matter of the independent patent claims. Advantageous developments of the invention are described by the dependent patent claims, and the following description with reference to the drawing.

In accordance with some embodiments, a radio modem is provided for a motor vehicle. The radio modem has an antenna arrangement, an analog-digital and digital-analog (AD-DA) converter coupled to the antenna arrangement, and a processor device. The antenna arrangement can be configured for the bidirectional conversion between a wired, electrical High Frequency (HF) signal and a radio signal. The antenna arrangement can thus comprise, for example, one or more antennas, and optionally an amplifier circuit. The AD-DA converter may be configured for the bidirectional conversion between a digital signal and an analog signal. The processor device is configured to exchange communications data between the motor vehicle and at least one object in the vicinity of the motor vehicle. The at least one object is particularly at least one other vehicle and/or at least one infrastructure component, in other words in each case, for example, a traffic light and/or a traffic sign with a communications module.

In accordance with some embodiments, the processor device is configured to support several communications standards. Each communications standard specifies a respective digital radio protocol stack for controlling communications, in other words exchanging communications data. Furthermore, each communications standard specifies a radio frequency for the radio signal. The radio frequency or the high-frequency (HF) can hereby lie for example in a frequency interval of 600 megahertz (MHz) to 5 gigahertz (GHz).

The processor device uses the AD-DA converter as well as the antenna arrangement for exchanging communications data. Exchanging communications data can hereby comprise transmitting at least some of the communications data to the at least one object and/or receiving at least some of the communications data from the at least one object.

In accordance with some embodiments, at least one mobile communications standard and/or at least one WLAN standard are provided as communications standards. As the mobile communications standard, at least one of the following is provided in particular: 5G, LTE-vehicle, LTE-D2D, LTE-ad-hoc. As the WLAN standard, at least the Institute of Electrical and Electronics Engineers (IEEE) 802.11p, also referred to as public wireless LAN (pWLAN) standard is provided.

In accordance with some embodiments, the processor device is also configured to select, as a function of a selection signal, a communications standard from the provided communications standards and to implement it in the following manner. By means of the processor device itself, the radio protocol stack of the selected communications standard is operated as a software module. To this end, an arrangement of at least one program module can be executed in the described manner. Furthermore, the processor may operate a digital mixer, which is coupled to the radio protocol stack on a baseband side. In other words, on its baseband side, the digital mixer exchanges digital data with the radio protocol stack. The digital mixer is operated with the currently needed or set radio frequency. In other words, the mixer modulates and/or demodulates using a digital modulation/demodulation signal, which has radio frequency $f_0$.

The radio modem in accordance with the embodiments disclosed hereby offers the advantage that no additional components are needed to operate multiple radio protocol stacks. Depending on the selected communications standard, a software module is operated with the corresponding radio protocol stack and a connection to the antenna arrangement is achieved through a digital mixer.

In accordance with some embodiments, to transmit communications data, the radio modem executes the following method.

As a function of a selection signal from provided multiple radio protocol stacks, the processor device selects a radio protocol stack and the radio protocol stack of the selected communications standard operates as a software module as well as a digital mixer, which is coupled on a baseband side to the radio protocol stack and on an HF side to an AD-DA converter.

A suitable processor device can be a processor, e.g., a microprocessor (integrated, programmable circuit), a digital signal processor (DSP), a field programmable gate array (FPGA), an application specific integrated circuit (ASIC).

In accordance with some embodiments, the processor device and the AD-DA converter are provided as a common, integrated circuit. This results in a particularly compact construction of the radio modem.

Other developments, whose features may result in additional advantages are disclosed.

In accordance with some embodiments, an HF side of the digital mixer is coupled to the AD-DA converter. The HF side of the digital mixer thereby provides for the operation at the radio frequency. In other words, the digital mixer is configured to generate a digital HF signal on the HF side for sending out digital data of the baseband side, said HF signal having a frequency component that corresponds to the radio frequency. In addition, the digital mixer is intended to receive a digital HF signal from the AD-DA converter and to mix it down through digital demodulation into the baseband, and to thereby provide digital data generated on the baseband side to the protocol stack. The AD-DA converter is correspondingly coupled directly to the processor. The described exchange of the digital HF signal between the HF side of the digital mixer on the one hand and the AD-DA converter on the other is hereby made possible.

In other words, the digital signal of the AD-DA converter corresponds to the digital HF signal from the HF side of the mixer. The AD-DA converter is thus connected between the processor and the antenna arrangement on the HF side. The AD-DA converter hereby exchanges its analog signal with the antenna arrangement. In other words, the electrical HF signal of the antenna arrangement corresponds to the analog signal of the AD-DA converter.

In accordance with some embodiments, the processor simultaneously makes available multiple communications standards and that the processor is configured in each case to operate one of the provided communications standards as a function of a selection signal. The communications standards may be held ready for example in each case by the at least one described corresponding program module in a data memory of the processor, and results in the advantage that the processor can switch among communications standards while in operation. Then, in each case the protocol stack can be provided and the antenna arrangement can also be operated with the associated radio frequency.

In accordance with some embodiments, a control unit is provided, which is configured to sequentially select in each case one of the communications standards using the selection signal in the processor. In other words, the control unit generates the selection signal in such a manner that the processor device sequentially activates or implements one of the communications standards. The control unit may be provided as a component of the processor, for example as a program module. The control unit may also comprise a component and/or control program that is different from the processor. The control unit is also configured to verify and signal whether the exchange of communications data with the object using the currently selected communications standard is successful. In other words, the control unit tries out the various communications standards alternatingly or sequentially and detects whether a communications link to the at least one object could be configured successfully. As already explained, the Car2X communications can involve various communications standards. So that the motor vehicle can establish a communications link with the at least one object, it must therefore know what communications standard it must use. The radio modem may find this out by the control unit independently trying out the provided communications standards one after the other until a successful transmission of the communications data is detected.

In accordance with some embodiments, the control unit is configured to adjust the selection of the communications standards as a function of a publicly available description, e.g., a table. In this way, in a predetermined region, for example a country, the publicly available description can provide a list of the usable or intended communications standards for Car2X communications. The control unit can then receive this description and use it to select from the provided communications standards those that are intended for the region.

In accordance with some embodiments, the processor is configured to provide a mobile communications standard, particularly LTE. The radio modem hereby operates the AD-DA converter in a transmit mode provided according to a standard and it operates the mixer inversely. In other words, the radio modem is preferably configured to receive the communications data from an uplink channel, and transmit to a base station. The radio modem hereby receives the communications data, which is transmitted by the object via the uplink channel, by bypassing the base station. In other words, in the uplink channel the modem receives or monitors the communications data of the at least one object. Based on a mobile communications standard, direct communications or a direct data exchange between the motor vehicle on the one hand and the at least one object on the other can hereby occur, without a base station being necessary for this purpose. In regard to a communications standard, which has the same radio frequency for transmitting and receiving, and hereby specifies time-multiplexing for transmit and receive times, the radio modem can be switched to "receive" according to transmission times to receive the communications data without the base station.

In accordance with some embodiments, a motor vehicle, which has the radio modem as described in this application is disclosed. The motor vehicle may be-an automobile, e.g., a passenger car or a truck.

A PHOSITA may also understands that the above disclosure also describes the method steps, and, therefore, the method steps are not described here again.

The described components of the design each represent individual features to be considered independently of each other, which may also be considered, individually or in a different combination than the one shown. Furthermore, the described design can also be supplemented by additional features in accordance with the embodiments already been described herein.

FIG. 1 illustrates a schematic view of a motor vehicle system, in accordance with some embodiments.

A motor vehicle 10, which may involve for example an automobile, particularly a passenger car, may have a radio modem 11, by means of which a vehicle component 12 can create, set up or operate a communications link 15 for exchanging communications data 16 with at least one object 13 in the vicinity 14 of motor vehicle 10. Vehicle component 12 may be for example a driver assistance system or an infotainment (information-entertainment) system. Communications data 16 may be for example position data and/or maneuver data for describing a planned or just-performed driving maneuver. Object 13 may be for example an additional vehicle or an infrastructure component of a transportation route network.

Radio modem 11 may comprise or have a processor 10 and an antenna element 18. Processor 17 may be for example a digital signal processor or a microprocessor or a combination of multiple computers. Antenna element 18 may have an AD-DA converter 19 and an antenna arrangement 20. Antenna arrangement 20 may comprise for example an antenna 21 or multiple antennas. By means of antenna 21, radio signals 22 can be exchanged using antenna arrangement 20' of object 13. Radio signals 22 here are in particular electromagnetic waves, which can have their spectrum in a frequency range of 600 megahertz to 5 gigahertz for example. These are thus high-frequency (HF) radio waves. Antenna arrangement 20 converts between radio waves 22 and an electrical HF signal 23, which can be transmitted via an electrical line 24, a coaxial cable for example, from AD-DA converter 19 to antenna arrangement 20 (transmit) or from antenna arrangement 20 to AD-DA converter 19 (receive). The AD-DA converter converts between analog HF signal 23 and a corresponding digital HF signal 25, which the AD-DA converter can exchange or transmit with processor 17 via a data link 26. Data link 26 can have a data rate ranging from 10 gigabit per second to 25 gigabit per second for example. The data link can be electrical or optical.

In addition, processor 17 may be connected via control cables 27 to a control interface 28 of antenna element 18 to, for example, set a scan rate of the AD-DA converter and/or to adjust or tune antenna arrangement 20 to a currently used radio frequency.

The analog signal of the AD-DA converter may be used directly to operate antenna arrangement 20. This is because digital HF signal 25 can already have the frequency components that correspond to radio frequency $f_0$ of radio signal 22. In other words, no separate, analog mixer or frequency converter is necessary.

Processor 17 has a digital mixer 29, which is operated at the currently required or set radio frequency $f_0$. In other words, mixer 29 modulates and/or demodulates using a digital modulation/demodulation signal, which has radio frequency $f_0$.

To establish communications link 15 with object 13, it is also necessary to comply with or follow a communications protocol so that the transmitted communications data can be interpreted correctly by object 13 and motor vehicle 10. To this end, there is provided in processor 17 a communications stack or protocol stack 30, which can exchange communications data 16 with vehicle component 12 and which, according to the communications protocol, exchanges processed baseband data 31 with a baseband side 32 of mixer 29. Digital HF signal 25 is exchanged via data link 26 on an HF side 33.

In processor 17, a control unit 34 can determine which protocol stack 30 is operated and which radio frequency $f_0$ is used by mixer 29. For example, protocol stack 30 and radio frequencies $f_0$ may be provided in processor 17 for several different communications standards 35, of which in each case one can be established or selected by selection signal 36 of control unit 34. To this end, a description, e.g., in the form of a table 37, may be provided, with which object 13 can also be operated, for example. Motor vehicle 10 and object 13 can hereby coordinate by trying out or testing communications standards 35 established in table 37 until a common communications standard 25 is set or found.

A possible communications standard is a mobile communications standard, such as an LTE and/or a 5G for example. This mobile communications standard defines in particular an uplink channel 38, over which for example object 13 can transmit toward a base station 39 of a mobile communications network. Radio modem 11 can be configured to adjust the radio frequency of uplink channel 38 as radio frequency $f_0$ for receiving and to hereby also receive communications data 16 of object 13 transmitted in uplink channel 38 and to provide said data directly, without requiring base station 39, to vehicle component 12 as received communications data 16. The radio modem is thereby inversely operated at radio frequency $f_0$, specifically not as a transmitter, but as a receiver. Given a communications standard that provides for the same radio frequency for transmitting and receiving, and hereby specifies time-multiplexing for transmit and receive times, the radio modem can be switched to "receive" according to transmit times to receive the communications data 16 without base station 39.

In regard to motor vehicle 10, there is thus the basic idea of configuring a radio modem 11, which replicates a universal radio interface, in a multifunctional manner. The hardware can hereby cover at least two currently competing communications or radio standards for future Car2X communications (specifically, pWLAN and 5G LTE-vehicle). By means of program modules of processor 17, one can then set which of the communications standards are operated at a particular point in time. By means of the described universal radio modem, and using the fast, broadband AD-DA converter and preprocessed protocol stack 30, one can then configure via software according to which communications standard radio link 15 is to be set up.

In this way, multiple infotainment and/or communication services, e.g., Car2Car communications and/or driver assistance functions, can be implemented in a vehicle control unit and to that end, a so-called software-defined radio (SDR) can be used, which can adaptively operate various communications standards, instead of utilizing dedicated silicon chips.

In this way, when providing or manufacturing a motor vehicle, one can decide to operate the Car2Car communications according to the pWLAN standard or the 5G mobile communications standard. For example, this can be permanently programmed into processor 17, so that only program modules have to be provided for one communications standard in each case. However, it may also be planned to make multiple communications standards 35 selectable by means of control unit 34.

In order to also use uplink channel 38 of a mobile communications standard as it is intended in the LTE mobile communications standard, an ad hoc broadcast mode can be implemented, which provides for the described channel access via carrier sense multiple access with collision avoidance (CSMA/CA) on uplink channel 38.

Overall, the example shows how the invention can provide an LTE-5G multi-RAT modem for future Car2X systems.

The invention claimed is:
1. A radio modem for a motor vehicle, comprising:
an antenna arrangement;
an analog-to-digital and digital-to-analog (AD-DA) converter coupled to the antenna arrangement;
a control unit configured to generate a selection signal; and
a processor for exchanging communications data between the motor vehicle and at least one object in a vicinity of the motor vehicle, wherein the processor is configured to:
provide support for a plurality of communications standards, wherein each communications standard of the plurality of communications standards comprises a digital radio protocol stack, and a radio frequency for a radio signal;
select at least one of the supported communications standards for the radio signal as a function of the selection signal;
implement the selected at least one of the supported communications standards by operating the digital radio protocol stack as a software module; and
implement a digital mixer to generate the radio frequency, to modulate using a digital modulation signal, and to demodulate using a digital demodulation signal,
wherein the digital mixer is coupled to the digital radio protocol stack on a baseband side and to the AD-DA converter on a high-frequency (HF) side, and
wherein the control unit is further configured to:
select sequentially one communications standard from the plurality of communications standards for the radio signal,
verify the selected one communications standard is required to exchange the communications data with the at least one object, and
in response to verifying that the selected one communications standard is required, send the radio signal using the selected one communications standard.

2. The radio modem of claim 1, wherein the digital mixer generates the radio frequency of the selected communications standard on the HF side, and
wherein the AD-DA converter is connected directly between the digital mixer and the antenna arrangement, thereby providing a digital signal as an input to the digital mixer on the HF side and providing an electrical analog HF signal as an input to the antenna arrangement.

3. The radio modem of claim 1, wherein the control unit is further configured to set the selection of the one communications standard based on a publicly available description.

4. The radio modem of claim 1, wherein the at least one of the supported communications standards is one of: a 5G, a Long-Term Evolution (LTE), an LTE-vehicle, an LTE device-to-device (LTE-D2D), an LTE-ad-hoc, an IEEE 802.11p standard, and a public wireless LAN (pWLAN).

5. The radio modem of claim 1,
wherein the selected at least one of the supported communications standards is a Long-Term Evolution (LTE), and
wherein the processor is further configured to:
receive the communications data transmitted by the at least one object directly via an uplink channel by bypassing a base station, and
transmit the received communications data to the base station.

6. The radio modem of claim 1, wherein the processor is one of: a microprocessor, a digital signal processor (DSP), an field programmable gate array (FPGA), and an application specific integrated circuit (ASIC).

7. The radio modem of claim 1, wherein the processor and the AD-DA converter are provided as a common integrated circuit.

8. A motor vehicle, comprising:
a radio modem, the radio modem comprising:
an antenna arrangement;
an analog-to-digital and digital-to-analog (AD-DA) converter coupled to the antenna arrangement;
a control unit configured to generate a selection signal; and
a processor configured to:
provide support for a plurality of communications standards, wherein each communications standard of the plurality of communications standards comprises a digital radio protocol stack, and a radio frequency for a radio signal;
select at least one of the supported communications standards for the radio signal as a function of the selection signal;
implement the selected at least one of the supported communications standards by operating the digital radio protocol stack as a software module; and
implement a digital mixer to generate the radio frequency, to modulate using a digital modulation signal, and to demodulate using a digital demodulation signal,
wherein the digital mixer is coupled to the digital radio protocol stack on a baseband side and to the AD-DA converter on a high-frequency (HF) side, and wherein the control unit is further configured to:
 select sequentially one communications standard from the plurality of communications standards for the radio signal,
 verify the selected one communications standard is required to exchange communications data with at least one object, and
 in response to verifying that the selected one communications standard is required, send the radio signal using the selected one communications standard,
 thereby exchanging the communications data between the motor vehicle and the at least one object in a vicinity of the motor vehicle.

9. A method, comprising:
 selecting, at a radio modem, a radio protocol stack from a plurality of radio protocol stacks for a radio signal, wherein the radio protocol stack is selected as a function of a selection signal, and wherein the selection signal is generated at a control unit of the radio modem;
 sequentially selecting, at the radio modem, one communications standard from the plurality of communications standards for the radio signal;
 verifying, at the radio modem, the selected one communications standard is required to exchange communications data with at least one object; and
 in response to verifying that the selected one communications standard is required, sending the radio signal using the selected one of the communications standard;
 operating, at a processor of the radio modem, the selected radio protocol stack as a software module; and
 operating, at the processor of the radio modem, a digital mixer to generate the radio frequency, to modulate using a digital modulation signal, and to demodulate using a digital demodulation signal,
 wherein the digital mixer is coupled to the radio protocol stack on a baseband side and to an AD-DA converter on a high-frequency (HF) side,
 thereby exchanging the communications data between the motor vehicle and the at least one object in a vicinity of the motor vehicle.

* * * * *